(12) United States Patent
Busscher et al.

(10) Patent No.: US 8,871,124 B2
(45) Date of Patent: Oct. 28, 2014

(54) METHOD FOR PRODUCING A FILAMENT YARN FROM AN AROMATIC POLYAMIDE

(75) Inventors: Leonardus A. G. Busscher, Duiven (NL); Jacobus Johannes Meerman, Arnhem (NL); Ronald Eduard Hoogerwerf, Arnhem (NL); Alexander L. L. Broekhof, Arnhem (NL)

(73) Assignee: Teijin Aramid B.V., Arnhem (NL)

( * ) Notice: Subject to any disclaimer, the term of this patent is extended or adjusted under 35 U.S.C. 154(b) by 598 days.

(21) Appl. No.: 13/201,966

(22) PCT Filed: Feb. 12, 2010

(86) PCT No.: PCT/EP2010/051755
§ 371 (c)(1),
(2), (4) Date: Aug. 17, 2011

(87) PCT Pub. No.: WO2010/094620
PCT Pub. Date: Aug. 26, 2010

(65) Prior Publication Data
US 2011/0300379 A1    Dec. 8, 2011

(30) Foreign Application Priority Data
Feb. 17, 2009    (EP) .................................... 09153028

(51) Int. Cl.
| | |
|---|---|
| D01F 6/60 | (2006.01) |
| D01D 1/10 | (2006.01) |
| D01D 5/06 | (2006.01) |
| D01D 1/09 | (2006.01) |
| B29C 47/00 | (2006.01) |
| B29C 47/20 | (2006.01) |

(52) U.S. Cl.
CPC ............... D01D 5/06 (2013.01); *B29C 47/0014* (2013.01); *B29C 47/20* (2013.01); D01D 1/106 (2013.01); D01F 6/605 (2013.01); D01D 1/09 (2013.01)
USPC .......................................... 264/169; 264/184

(58) Field of Classification Search
USPC ........................................ 264/169, 184, 210.8
See application file for complete search history.

(56) References Cited

U.S. PATENT DOCUMENTS

| | | | |
|---|---|---|---|
| 2,761,754 A | * | 9/1956 | Jones et al. .................... 264/169 |
| 5,173,236 A | | 12/1992 | Yang |

(Continued)

FOREIGN PATENT DOCUMENTS

| | | |
|---|---|---|
| DE | 197 15 584 A1 | 10/1998 |
| EP | 0 138 011 A2 | 4/1985 |

(Continued)

OTHER PUBLICATIONS

Mar. 15, 2010 International Search Report issued in International Application No. PCT/EP2010/051755 (with translation).

(Continued)

*Primary Examiner* — Leo B Tentoni
(74) *Attorney, Agent, or Firm* — Oliff PLC (57) ABSTRACT

A method for producing a filament yarn from a para-aromatic polyamide, having an optically anisotropic aramid spinning solution filtered within a spinneret arrangement by using a filter having passage openings and extruded within the spinneret arrangement through a plurality of spinning orifices. The extruded anisotropic aramid spinning solution is guided via an air gap, stretched in the process, and collected in an aqueous coagulation bath. The optically anisotropic aramid spinning solution in the spinneret arrangement is fed to the spinning orifices via a flow resistor. The flow resistor is arranged closer to the spinning orifices than the filter, and the flow resistor and the filter are arranged at a distance to one another. The method may also include a para-aromatic polyamide filament yarn.

7 Claims, 4 Drawing Sheets

(56) References Cited

U.S. PATENT DOCUMENTS

| | | | |
|---|---|---|---|
| 5,250,633 A * | 10/1993 | Calundann et al. | 525/420 |
| 2008/0095875 A1* | 4/2008 | Rebouillat et al. | 425/198 X |
| 2009/0078641 A1* | 3/2009 | Monden et al. | 264/183 X |
| 2009/0127735 A1* | 5/2009 | Chokai et al. | 264/211 |

FOREIGN PATENT DOCUMENTS

| | | |
|---|---|---|
| EP | 0 823 499 A1 | 2/1998 |
| JP | U-50-76108 | 7/1975 |
| JP | A-59-168118 | 9/1984 |
| JP | A-11-189916 | 7/1999 |
| WO | WO 97/15706 A1 | 5/1997 |
| WO | WO 98/18984 A1 | 5/1998 |
| WO | WO-2007052825 A1 * | 5/2007 |
| WO | WO-2007102528 A1 * | 9/2007 |

OTHER PUBLICATIONS

Mar. 15, 2010 Written Opinion issued in International Application No. PCT/EP2010/051755 (with translation).

* cited by examiner

METHOD FOR PRODUCING A FILAMENT YARN FROM AN AROMATIC POLYAMIDE

BACKGROUND

The invention relates to a method for producing a filament yarn from an aromatic polyamide, in which an optically anisotropic aramid spinning solution is filtered within a spinneret arrangement using a filter having passage openings and is extruded within the spinneret arrangement through a plurality of openings. The extruded anisotropic aramid spinning solution is guided via an air gap, stretched in the process, and collected in an aqueous coagulation bath. The invention also relates to a para-aromatic polyamide filament yarn having a yarn count of at least 300 dtex, a textile fabric which has yarns of this type, as well as a penetration-resistant article which has a yarn of this type.

A method for producing a filament yarn from an aromatic polyamide is described in EP 0 823 499 A1. Using the known method, yarns are produced which have a filament linear density of less than 0.8 dtex. A focus of document EP 0 823 499 A1 is the production of yarns which have a filament linear density from 0.3 to 0.8 dtex. The yarns disclosed in this document have a maximum tenacity of 2630 mN/tex at a yarn count of 728 dtex and a filament linear density of 0.5 dtex.

Using the method described in WO 98/18984 A1, yarns are produced from a para-aromatic polyamide. For example, the yarns have filaments with a filament linear density of 0.66 dtex (0.6 den). However, the yarn count of these yarns is only 162 denier (178 dtex).

An aromatic polyamide filament yarn is described in JP 11 189 916. In Examples 1 and 2, the yarn has a yarn count of 270 denier (297 dtex), In Example 1 the tenacity of the yarn was 31.3 g/den (2845 mN/tex), and in Example 2 the tenacity was 30.9 g/den (2827 mN/tex). The linear density of the yarns in Examples 1 and 2 is 0.6 denier (0.66 dtex). A yarn is proposed in Example 6 having a yarn count of 1000 denier (1100 dtex) and a tenacity of 28.3 g/d (2572 mN/tex). In comparison with Examples 1 and 2, it is clear from Example 6 that at increasing yarn counts, the tenacity of these yarns decreases.

SUMMARY

However, a disadvantage in the methods known thus far is that during the production of yarns having a low filament linear density, the spinning process is interrupted after only a few hours by tearing of the filaments during spinning. Further, the tenacity of the filament yarns produced according to the above-described references is disadvantageously low, while at the same time the filament yarns have high yarn counts but low filament linear densities.

DETAILED DESCRIPTION OF EMBODIMENTS

A method for producing a filament yarn from an aromatic polyamide, in which the spinning process that may be performed continuously over a longer period of time is provided. In particular, the tearing of filaments during the spinning process may be prevented. Further, the tenacity of this yarn may be high despite a low filament linear density.

An optically anisotropic aramid spinning solution may be filtered within a spinneret arrangement using a filter having passage openings and may be extruded within the spinneret arrangement through a plurality of spinning orifices. The extruded anisotropic aramid spinning solution may be guided via an air gap, stretched in the process, and collected in an aqueous coagulation bath. The optically anisotropic aramid spinning solution in the spinneret arrangement may be fed to the spinning orifices via a flow resistor. The flow resistor may be arranged closer to the spinning orifices than the filter, and the flow resistor and the filter may be arranged at a distance to one another.

A spinneret arrangement may be understood to be an arrangement in which at least the filter, the flow resistor, and the spinneret plate are located in immediate proximity to one another. In immediate proximity may be understood to mean that the largest distance between the filter and the spinneret plate within the spinneret arrangement is less than 10 cm, such as less than 5 cm, or less than 2 cm. If the spinneret plate, the filter, and the flow resistor are located, for example, in the spinneret bead, then the spinneret head represents the spinneret arrangement. A pre-filter, for example, may be located in the proximity of a mixing element or a spinning solution pump, and thus would not be a filter within a spinneret arrangement because the filter is not located in the immediate proximity of the spinneret plate. In DE 197 15 584 A1, for example, a spinneret arrangement is disclosed in which only a textile fine filter is provided within a spinneret arrangement. A first pre-filter is provided within a cylindrical molded body and is thus outside of the spinneret arrangement.

The spinning solution to be processed may also be pre-filtered before the solution is fed to the spinneret arrangement. However, such a pre-filter is not in immediate proximity to the spinning orifices and the flow resistor, and thus is not part of the spinneret arrangement.

The flow resistor and the filter may have passage openings. The passage openings of the filter may be smaller than the passage openings of the flow resistor. Smaller passage openings of the filter compared to the passage openings of the flow resistor may be understood as when approximately 50% to 100%, such as 60% to 80%, of all passage openings of the flow resistor are larger than the passage openings of the filter. The passage openings of the filter may be used for comparison, said openings constitute approximately 40% to 100%, such as 60% to 90%, of all passage openings of the filter.

The size of the passage openings of the filter may be large enough that a ball having a maximum diameter of x μm may pass through the passage openings of the filter, the size of the passage openings of the flow resistor may be large enough that a ball having a maximum diameter of y μm may pass through the passage openings of the flow resistor, and x<y.

The diameter of the spinning orifices may be large enough that a ball having a maximum diameter of z μm may pass through the spinning orifices, the size of the passage openings of the flow resistor may be large enough that a ball having a maximum diameter of y μm may pass through the passage openings of the flow resistor, and z≥y.

if an additional filter function of the flow resistor is to be prevented, care should be taken in the selection of the size of the passage openings of the filter and of the flow resistor, so that particles that may pass through the filter in the spinneret arrangement under normal flow conditions (no additional pressure) may also pass through the flow resistor. A particle that has passed through the filter in the spinneret arrangement should not likely be subsequently held back by the flow resistor.

The flow resistor may have passage openings that are smaller than the passage openings of the filter within the spinneret arrangement. All passage openings or only a few of the passage openings of the flow resistor may be smaller than all of the passage openings of the filter or than a few of the passage openings of the filter in the spinneret arrangement. For example, 50% to 100% of the passage openings of the filter may be larger than selected passage openings in the flow resistor, the relative frequency of the passage openings in the flow resistor being from 40% to 100%.

The spinning orifices may have a diameter from 30 μm to 70 μm, such as 40 μm to 50 μm, or 45 μm. Further, the passage openings of the flow resistor may have a size of 5 μm to 70 μm, such as 9 μm to 25 μm. Likewise, the passage openings of the filter may have a size of 1 μm to 30 μm, or 15 μm.

The passage openings of the flow resistor may be large enough that balls having a maximum diameter of 5 μm to 70 μm may pass through the passage openings of the flow resistor.

Further, the passage openings of the filter may be large enough that balls having a maximum diameter of 1 μm to 30 μm may pass through the passage openings of the filter.

The majority of the spinning orifices, the majority of the passage openings of the flow resistor, and/or the majority of the passage openings of the filter lie in each case in a plane. These planes may run parallel to one another. The flow resistor may be arranged facing the spinning orifices, such that the passage openings of the flow resistor face the spinning orifices. For example, the spinning orifices maybe arranged distributed in a field-like manner across the spinneret plate. A layout of this type is presented for example in WO 97/15706 A1 in FIGS. 1 through 4. With respect to the flow resistor, this means that the flow resistor is arranged facing each field of spinning orifices. The flow resistor and the spinning orifices thus lie in parallel planes.

A wire mesh made from metal is may be used for the flow resistor. In general, however, every acid-resistant and heat-resistant material that has a good dimensional stability may be used for the flow resistor. The material for producing the flow resistor is may be resistant to sulfuric acid and should not deform at temperatures from 0 to 80° C. Textile materials, such as non-wovens or wovens, but also ceramic, polyamides, or glass are possible materials for the production of the flow resistor. A plurality of alternatives is possible for the flow resistor. The flow resistor may be formed by a wire mesh. Using a flow resistor with a low wire thickness may advantageously prevent undesirably large "shadows" from falling on the spinning orifices due to the wire thickness. Due to these "shadows", the spinning orifices are partially or possibly completely covered by the structure (wire) of the flow resistor. Flow resistors may be made from structures having a low thickness. Since flow resistors of this type may be unstable under certain circumstances, the flow resistor may be placed on a support structure. Supporting the flow resistor on the support structure may advantageously prevent the thin flow resistor from being damaged or altered in shape by the pressure present in the method. The support structure may be, for example, a circular frame having braces within the frame, thus similar to a wheel. Further, the support structure may be provided as a grid, having grid passages that are substantially larger than the passages of the flow resistor. The passages of the support structure, also referred to as cut-outs, may be located within the support structure in relation to the spinning orifices such that the spinning orifices are not covered at all or are barely covered by the support structure. The flow resistor may also be robust so that no support structure is required.

Aromatic polyamide filament yarn may be spun continuously for up to 3 hours without an interruption. The aromatic polyamide filament yarn may be spun for up to three days without an interruption. The aromatic polyamide filament yarn may be spun for 30 days without an interruption.

A continuous spinning process without an interruption may be understood as one in which the spinning process does not have to be interrupted because one or more filaments tear during the spinning process, or the spinning is faulty or no longer possible.

The spinning solution may be a solution made of poly (paraphenylene terephthalamide) [PPTA] in concentrated sulfuric acid. The PPTA spinning solution may have a polymer concentration of 10 wt % to 20 wt %. The aqueous coagulation bath may have a sulfuric acid concentration of 0% to 20%. During the spinning process, the coagulation bath may be held at a temperature from −5° C. to 20° C., such as from 0° C. to 10° C., and has a depth of 10 mm to 20 mm.

A para-aromatic polyamide filament yarn may have a yarn count of at least 300 dtex and a tenacity of at least 2700 mN/tex. The polyamide filament yarn may have a bundle of filaments having a filament linear density from 0.8 dtex to more than 0.3 dtex. The tenacity of the polyamide filament yarn may be 2750 mN/tex and the filament linear density may be 0.6 dtex to 0.4 dtex. The tenacity of the polyamide filament yarn is determined according to ASTM D-885.

The temperature of the coagulation bath, and the sulfuric acid concentration in the coagulation bath, may be set low in order to produce a polyamide filament yarn made of PPTA having a high tenacity.

The para-aromatic polyamide filament yarn may be suitable for the production of textile fabrics and/or for the production of penetration-resistant articles that have the para-aromatic polyamide filament yarn.

A penetration-resistant article may be understood, for example, to be a protective vest, a protective jacket, a helmet, a vehicle panel, or a building cladding, by means of which a penetration-inhibiting effect is achieved.

In summary, the filaments of yarns made from an aromatic polyamide may have a filament linear density between 0.8 and 0.3 dtex, and may be produced in an advantageous way over a longer time period than could be achieved using the methods from the above-described references. This is made possible by using a flow resistor, wherein the flow resistor may have small passage openings and the material for forming the flow resistor may have a low thickness. The method is suited for producing filament yarns having a filament linear density in the range from 0.8 to more than 0.3 dtex, such as from 0.6 to 0.4 dtex, continuously over a longer period of time. The yarns may have, at a filament linear density of 0.8 dtex at the highest, a surprisingly higher tenacity than the yarns produced according to the previously known methods. For example, in document EP 0 823 499 A1, the yarns produced according to the method described therein have, at a filament linear density of less than 0.8 dtex, a tenacity of 2630 mN/tex, at most. However, the yarns produced according to the present disclosure have tenacities of at least 2700 mN/tex and even significantly above 2800 mN/tex. An aromatic polyamide yarn may be produced having a yarn count of at least 300 dtex, comprising a bundle of filaments having a filament linear density of 0.8 to more than 0.3 dtex, and a tenacity of 2700 to 3250 mN/tex.

Further description is provided with reference to the figures.

Figure 1:
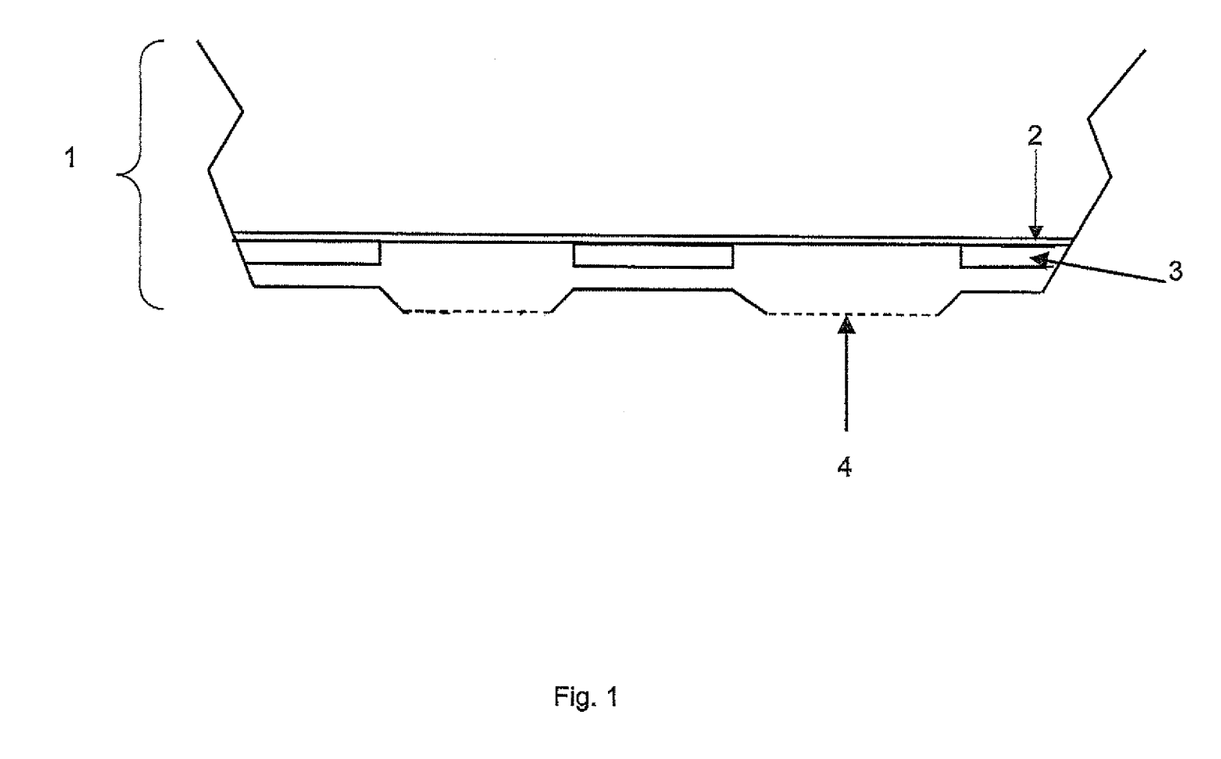
FIG. 1 schematically shows a spinneret arrangement in cross-section.

A spinneret arrangement is schematically shown in cross-section in FIG. 1. The spinneret arrangement has a plurality of continuous spinning orifices 4, which are distributed across a spinneret plate in a field-like manner. Although in each case a plurality of spinning orifices 4 are present in each field of the spinneret plate, in the following, a single spinning orifice 4 will also be discussed. When viewed from a coagulation bath, a plate 3 having cut-outs lies above the spinning orifice 4. The cut-outs of plate 3 are adapted in shape and size to the fields of the spinning orifices 4 such that the spinning orifices 4 are not covered by plate 3. The cut-outs of plate 3 have at least the size of the fields of the spinning orifices 4, whereby the shape of a cut-out substantially corresponds to the shape of a field. The plate 3 is arranged at a distance to the spinneret plate and may be made of metal. Plate 3 serves as a support structure in order to stabilize the flow resistor 2, which lies thereupon, and is therefore also designated as support structure 3. The flow resistor 2 may extend over the cut-outs of the support structure 3 and the spinning orifices 4 and may include for example, a wire mesh or a sieve or a plurality of individual wire meshes. Naturally, meshes made from materials other than metal are also possible materials that may be used for the flow resistor 2. When using individual wire meshes, the individual wire meshes may be at least partially in contact with the support structure 3. The wire mesh may have loops. The mesh size of the flow resistor 2 is thereby for example larger than the mesh size of a filter 8 (not shown in FIG. 1), which filter is placed in front of the flow resistor 2 and within the spinneret arrangement 1 and filters the spinning solution an additional time. The flow resistor 2 should thus not have any filter effect in the design, because the passage openings of the filter 8 are smaller than the passage openings of the flow resistor 2. A non-robust wire may also be used to form the flow resistor 2 because the wire mesh does not have to hold back any elements from the spinning solution. Using the support structure 3 may advantageously prevent damage to the flow resistor 2 by spinning solution flowing through the flow resistor 2. Despite the non-robust wire, the flow resistor 2 nevertheless offers a resistance to the spinning solution. The spinning process is influenced by the resistance generated by the flow resistor 2 in an advantageous way such that continuous spinning processes of more than 3 days are possible. A continuous spinning process should be considered thereby as ending when the first of the filaments to be spun tears undesirably during the spinning process and/or spinning is faulty or no longer possible. The method may be advantageous for creating filament yarns having a low filament linear density but a high tenacity.

Figure 2:
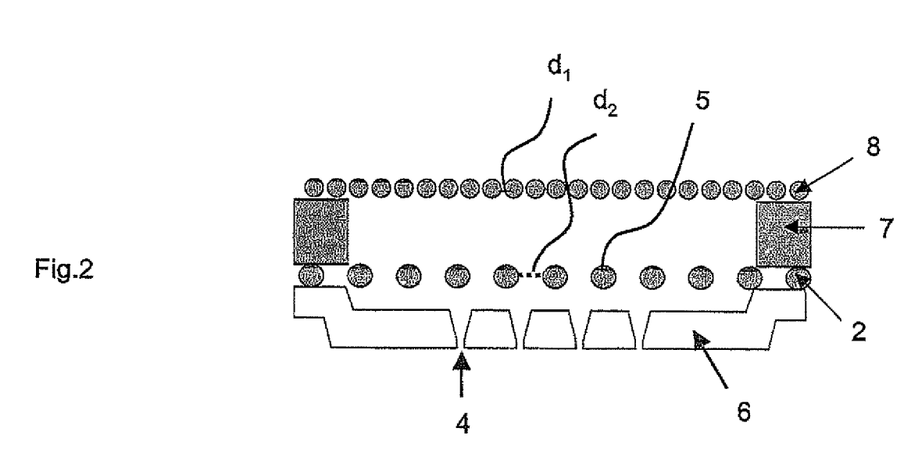
FIGS. 2 to 5 schematically show in each case cross-sections of a spinneret arrangement having a filter and a flow resistor.

A cross-section of a spinneret arrangement 1 is schematically shown in detail in FIG. 2. Filter 8 is provided above the flow resistor 2 and above the spinning orifices 4. So that the filter 8 and the flow resistor 2 do not lie on top of one another, a spacer 7 is provided, and the filter 8 lies on top of said spacer, The spinning orifices 4 lie within a spinneret plate 6 and taper in the direction of a coagulation bath (not shown). The filter 8 has passage openings that have a diameter of d1. The flow resistor 2 likewise has passage openings having a diameter of d2. The diameter d1 of the passage openings of the filter 8 may be smaller than the diameter d2 of the passage openings of the flow resistor 2. In FIG. 2, the flow resistor 2 is formed by a structure 5 which extends into the plane of the paper. The structure 5—in comparison with the spinning orifices 4—is relatively thick. The spinning orifices 4 may be partially or completely covered ("shadowed") by the structure 5. As a consequence, the flow of the spinning solution to the spinning orifices 4 may be influenced, for which reason the thickness of the structure 5 may be selected as smaller than the diameter of the spinning orifices 4. The spinning orifices 4 may have a size that corresponds to approximately 150% of the thickness of the structure 5.

Figure 3:
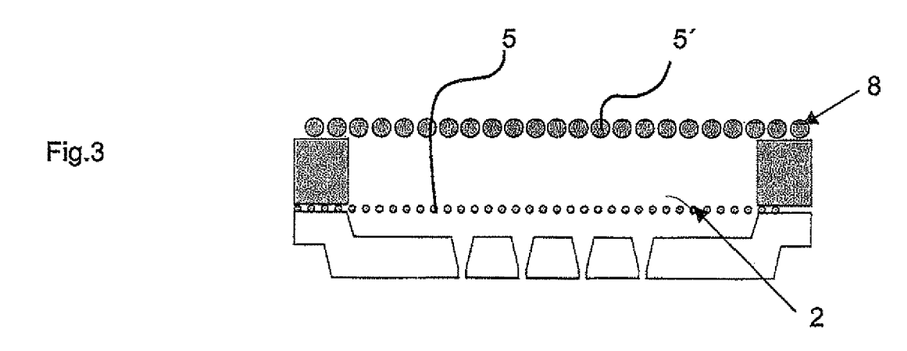

The embodiment of FIG. 3—as likewise in FIG. 2—schematically shows that the flow resistor 2 and the filter 8 may be formed by a grid structure. The grid of the flow resistor 2 and the grid of the filter 8 are thereby formed by structures 5 and 5', which run in the plane of the paper and may be wires. Additional structures (not shown) run perpendicular to the structures 5 and 5' and are in contact with the same such that a grid is created. The structures 5, which form the flow resistor 2, may be smaller than the structures 5', which form the filter 8. Despite this, as in the case cited just previously, the diameter d1 of the passage openings of the filter 8 may be smaller than the diameter d2 of the passage openings of the flow resistor 2 if the structures 5' of the filter 8 are placed closer together than the structures 5 of the flow resistor 2. The structures 5 of the flow resistor 2 and the structures 5' of the filter 8 may for example also be individual wires, and the wire thickness determines the size of structures 5 and 5'. In FIG. 3, the thickness of structure 5 is selected such that said structure is substantially smaller than the diameter of the spinning orifices 4. Thus, none of the spinning orifices 4 are completely covered by a structure 5. Thus, the flow of the spinning solution is not impeded during the spinning process in a manner such that, during the same time period, less spinning solution flows through covered spinning orifices 4 than though spinning orifices 4 that are not covered.

Figure 4:
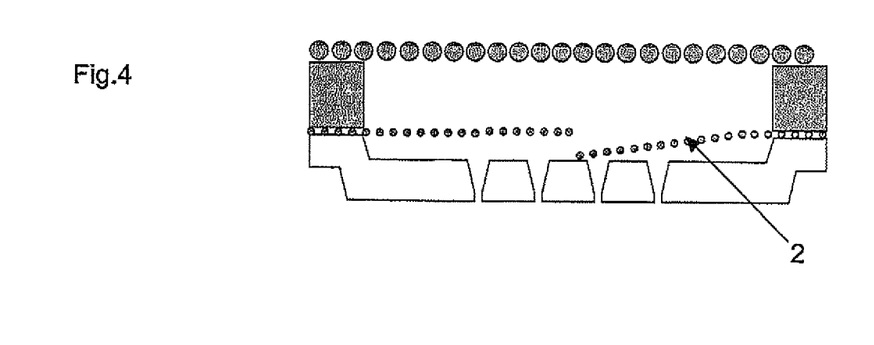

FIG. 4 schematically shows that the flow resistor 2 is broken apart approximately in the center. This type of damage to the flow resistor 2 may occur during the spinning process in that the flow resistor 2 does not withstand the pressure of the spinning solution. In the case of damage to the flow resistor 2, as is shown in FIG. 4, the calming of the spinning process, and thus a long-lasting spinning process, is no longer possible.

Figure 5:
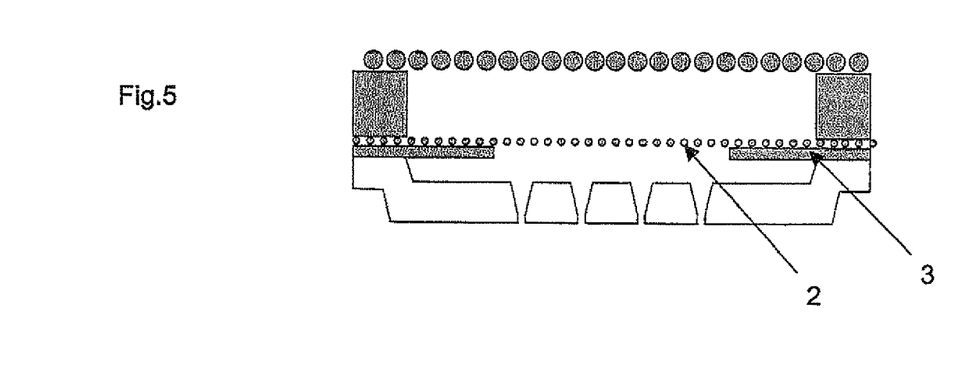

FIG. 5 schematically shows how damage of the flow resistor 2 may be prevented despite a very fine and non-robust structure 5. The flow resistor 2 is supported by the support structure 3. The support structure 3 is designed in the embodiment of FIG. 5 as a plate 3, wherein the plate 3 only covers the edge region of the spinneret plate 6, The spinning orifices 4 are not covered by the support structure 3. The flow resistor 2 in the embodiment lies at least in the edge regions on plate 3. By this means, the bending stress, which results from the bending moment for the flow resistor 2, may be decreased, by which means the danger of damage to the flow resistor 2 is decreased. The support structure 3 may, as in the embodiment according to FIG. 5, be provided only in the edge region of the spinneret plate 6 or may extend over the entire cross-section of the spinneret plate 6. In the latter case, the support structure 3 has cut-outs, wherein the cut-outs are provided above the spinning orifices 4 (see explanation for FIG. 1). In an advantageous way, the spinning orifices 4 are also not covered by the support structure 3.

Figure 6:
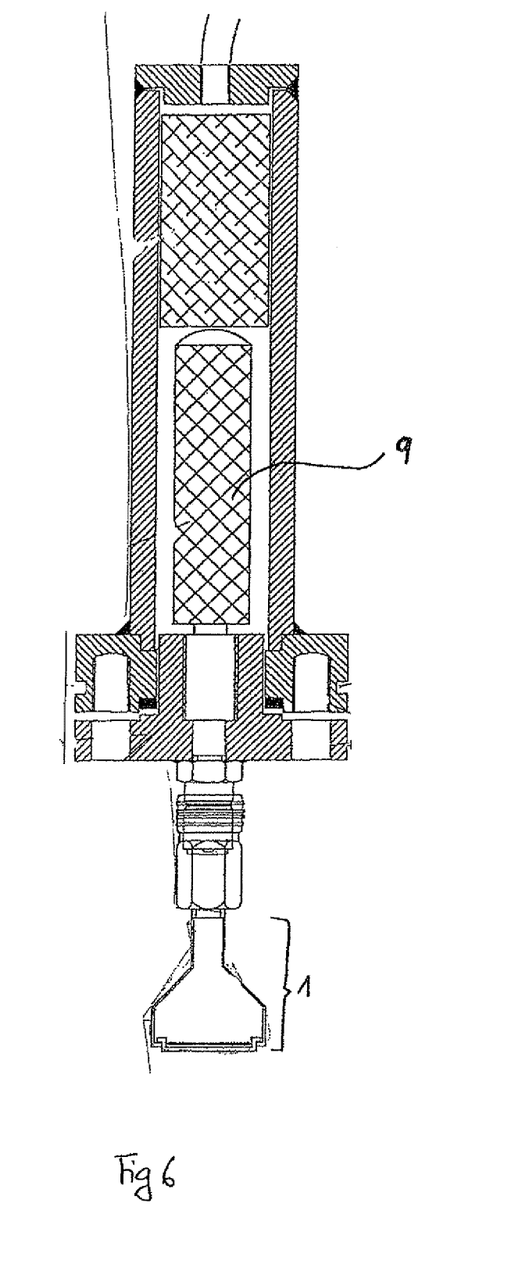
FIG. 6 schematically shows a spinneret arrangement with components attached thereto.

FIG. 6 schematically shows a device for spinning yarn. The device has a spinneret arrangement 1 and further components. The flow resistor 2, the filter 8, and the spinneret plate 6 with the spinning orifices 4 distributed in a field-like manner are located within the spinneret arrangement 1. The spinning solution may already be filtered before the solution is fed to the spinneret arrangement 1. For this purpose, an additional pre-filter 9 is provided in an inlet pipe. The filter 8 in the spinneret arrangement 1 serves in this design as a second filter, wherein the passage openings of the filter 8 in the spinneret arrangement 1 may be larger, the same, or smaller than the passage openings of the additional pre-filter 9 in the inlet pipe.

EXAMPLE

For the spinning process, a spinneret plate with 2000 spinning orifices was used so that 2000 filaments could be spun. After said 2000 filaments were coagulated in a coagulation bath, 1000 filaments in each case were consolidated into one yarn.

The spinning device for spinning has a spinneret plate with two fields, wherein each field has 1000 spinning orifices and each spinning orifice was large enough that a ball having a maximum diameter of 45 μm could pass through the spinning orifice. A filter was arranged above the spinning orifices, and the filter consisted of a wire mesh with a maximum wire gage of 70 μm. The passage openings of the filter were all large enough that a ball having a maximum diameter of 15 μm could pass through the passage openings of the filter. A support structure was arranged above the spinning orifices and below the filter, the structure resembling a flat metal wheel in shape and not completely covering the spinning orifices. A flow resistor was positioned lying on the support structure. The flow resistor likewise comprised a wire mesh having a gage of 25 μm. The passage openings of the flow resistor were all large enough that a ball having a maximum diameter of 25 μm could pass through the passage openings of the flow resistor. The distance between the support structure and the spinning orifices was 5 mm.

A coagulation bath was arranged beneath the spinning orifices, wherein the distance between the spinning orifices and the coagulation bath (the so-called air gap) was 6 mm.

An optically anisotropic spinning solution made from poly(paraphenylene terephthalamide), having a polymer concentration of 19.89% dissolved in 99.8% sulfuric acid, was used for the spinning solution. The spinning solution had a temperature of 86° C. After the spinning solution passed through first the filter, then the flow resistor, and finally the spinning orifices, the filaments were stretched 12.3 fold in the air gap. The stretched filaments finally arrived in the coagulation bath. The aqueous coagulation bath had a sulfuric acid concentration of 10%, a depth of 12 mm, and a temperature of 5° C. The filaments were subsequently washed (demineralized water), neutralized (0.73% NaOH in water), re-washed (demineralized water), and dried at a temperature of 165° C. Afterwards, the filaments were wound at a winding speed of 300 m/min.

The yarns spun according to this example had a filament linear density of 0.475 dtex, a tenacity of 2740-2820 mN/tex, an elongation at break of 3.4-3.5%, and a modulus of elasticity of 108-110 GPa. The yarn count of each yarn was 475 dtex. The measured specifications were determined according to ASTM D-885.

The invention claimed is:

1. A method for producing a filament yarn from an aromatic polyamide, comprising:
   filtering an optically anisotropic aramid spinning solution within a spinneret arrangement using a filter having passage openings; and
   extruding the filtered anisotropic aramid spinning solution within the spinneret arrangement through a plurality of spinning orifices, wherein:
   the extruded anisotropic aramid spinning solution is guided via an air gap, stretched in the process, and collected in an aqueous coagulation bath,
   the optically anisotropic aramid spinning solution in the spinneret arrangement is fed to the spinning orifices via a flow resistor,
   the flow resistor is arranged closer to the spinning orifices than the filter,
   the flow resistor and the filter are arranged at a distance to one another,
   the filter and the flow resistor have passage openings,
   the passage openings of the filter are smaller than the passage openings of the flow resistor,
   a diameter of the spinning orifices is large enough that a ball having a maximum diameter of z μm can pass through the spinning orifices,
   a size of the passage openings of the flow resistor is large enough that a ball having a maximum diameter of y μm can pass through the passage openings of the flow resistor, and
   $z \leq y$.

2. The method according to claim 1, wherein
a size of the passage openings of the filter is large enough that a ball having a maximum diameter of x μm can pass through the passage openings of the filter, and
$x < y$.

3. The method according to claim 1, wherein the spinning orifices have a diameter from 30 μm to 70 μm.

4. The method according to claim 1, wherein the spinning orifices have a diameter from 40 μm to 50 μm.

5. The method according to claim 1, wherein the size of the passage openings of the flow resistor is large enough that balls having a maximum diameter of 5 μm to 70 μm can pass through the passage openings of the flow resistor.

6. The method according to claim 1, wherein the size of the passage openings of the filter is large enough that balls having a maximum diameter of 1 μm to 30 μm can pass through the passage openings of the filter.

7. The method according to claim 1, wherein the flow resistor has a thickness that is less than the diameter of the spinning orifices.

\* \* \* \* \*

UNITED STATES PATENT AND TRADEMARK OFFICE
CERTIFICATE OF CORRECTION

PATENT NO. : 8,871,124 B2
APPLICATION NO. : 13/201966
DATED : October 28, 2014
INVENTOR(S) : Leonardus A. G. Busscher et al.

Page 1 of 1

It is certified that error appears in the above-identified patent and that said Letters Patent is hereby corrected as shown below:

In the Specification
Column 2, line 25, "bead" should be --head--.

In the Claims
Column 8, Claim 1, line 29, "$z \leq y$" should be --$z \geq y$--.

Signed and Sealed this
Seventeenth Day of February, 2015

Michelle K. Lee
*Deputy Director of the United States Patent and Trademark Office*